United States Patent [19]

Greenhalgh et al.

[11] 3,979,488
[45] Sept. 7, 1976

[54] PROCESS OF CONTINUOUSLY BLENDING, MOLDING AND CURING HEAT CURABLE POLYMERIC COMPOUNDS

[75] Inventors: Milton Sharples Greenhalgh, Bridgeport; Ray Clarence Lever, Fairfield, both of Conn.

[73] Assignee: General Electric Company, New York, N.Y.

[22] Filed: Dec. 20, 1973

[21] Appl. No.: 426,964

[52] U.S. Cl. .............................. 264/40.7; 264/174; 264/176 R; 264/329
[51] Int. Cl.² ....................................... B29F 1/08
[58] Field of Search ............... 264/176 R, 349, 329, 264/211, 236, 174, 40; 260/67.6 R, 94.9 GD; 425/204, 376

[56] References Cited
UNITED STATES PATENTS

| | | | |
|---|---|---|---|
| 2,836,851 | 6/1958 | Holt | 264/176 R |
| 2,857,624 | 10/1958 | Hanzel et al. | 264/177 R |
| 3,054,142 | 9/1962 | Hinderer et al. | 264/174 |
| 3,078,511 | 2/1963 | Street | 260/67.6 R |
| 3,148,231 | 9/1964 | Spencer | 264/40 |
| 3,358,334 | 12/1967 | Hendry | 264/349 |
| 3,461,490 | 8/1969 | Cottingham | 425/113 |
| 3,467,743 | 9/1969 | Otani | 264/176 R |
| 3,546,326 | 12/1970 | Seifert et al. | 264/211 |
| 3,591,674 | 7/1971 | Engel | 264/329 |
| 3,661,877 | 5/1972 | Bluestein et al. | 260/86.7 |
| 3,864,069 | 2/1975 | Takiura et al. | 264/349 |

FOREIGN PATENTS OR APPLICATIONS

| | | | |
|---|---|---|---|
| 2,162,329 | 7/1972 | Germany | 264/176 R |

Primary Examiner—Jay H. Woo
Attorney, Agent, or Firm—R. G. Simkins; P. L. Schlamp; F. L. Neuhauser

[57] ABSTRACT

A process of increasing the output and other efficiencies and benefits in continuous extrusion manufacturing operations, including blending and plasticizing, molding to shape and curing heat curable polymeric compounds to a thermostat condition. The process comprises the continuous coincidental mixing and heating of heat curable polymeric compounds, raising the temperature thereof up to substantially the level of their curing temperatures, and the consecutive forming to shape and curing of the shaped polymeric compounds to a thermostat condition. The process is primarily carried out within an extruder or equivalent continuous forming apparatus, and any additional heat needed to achieve or accelerate the attainment of curing temperatures, or to complete the conversion to a cured thermoset condition of the polymeric compounds can be readily applied by any external source of heat. This process is especially suitable and effective in the manufacture of elongated electrical conductors or wires coated or insulated with thermosetting polymeric materials or compositions comprising the same. The invention also includes a novel apparatus for the effective and complete performance of the process.

14 Claims, 1 Drawing Figure

PROCESS OF CONTINUOUSLY BLENDING, MOLDING AND CURING HEAT CURABLE POLYMERIC COMPOUNDS

BACKGROUND OF THE INVENTION

The manufacture of products from heat curable or thermosetting polymeric materials utilizing continuous forming procedures, such as extrusion processes, requires ancillary means or steps to achieve a continuous and effective heat induced curing of the formed product in concert with the operation of the extruder and its rate of output. Moreover, the usual means or steps for heat curing a continuously produced product are frequently cumbersome, expensive, and sometimes impede the overall manufacturing process or affect product quality.

For example, elongated steam chambers, typically comprising a long length of pipe supplied with steam, are commonly employed in tandem with an extruder apparatus to raise the temperature of heat curable extruded products up to the level of their curing condition. A product continuously emanating from the forming extruder is passed through the elongated steam chamber and while moving therethrough the heat curable product is heated to curing conditions by contact with the steam atmosphere. The attainment of curing temperatures or conditions with such continuous curing systems depends, of course, upon several significant factors, including especially the temperature of the steam or of the chamber atmosphere and the residence time of exposure of the heat curable material thereto, as well as the mass and the heat transferring or conductivity properties of the material to be heated while in passing contact with the heat source. Thus, to achieve increased rates of production output in such continuous manufacturing operations for heat cured products, either the temperature of the steam or other heating medium within the curing chamber, or the residence time of the product continuously moving through the curing chamber and in contact with the steam or other heating medium, or both, must be increased to effect the cure in the faster produced and moving materials.

However, because of the well known temperature-pressure characteristics of steam, any increase in steam temperatures is inherently accomplished by a disproportionally greater increase in pressure. The extensive increases in steam pressures due to moderate increases in its temperature to accelerate curing rates or the conditions for curing, require costly and massive confining measures and complex apparatus to generate, transmit or handle, and operate high pressure curing chambers for the continuous passage of products therethrough. Accordingly, rather than increase steam temperatures and incur excessive steam pressures, steam curing chambers have been extended further and further in length as the production capabilities of modern extrusion apparatus have been increased and manufacturing costs have pressed the need for greater output in order to provide sufficient residence time therein for contact with the steam to reach curing temperatures through the overall mass of the product continuously and rapidly moving therethrough.

Extensions of the length of heat curing chambers commensurate with increased production output capabilities or improved extruders to attain the necessary product residence time to reach curing temperature conditions penetrating the depth of the mass of the heat curable material for effective complete cures, creates inconvenient and excessive factory or floor space requirements and costs, as well as problems in handling and transporting the ware through chambers of great length.

The obvious shortcomings of such systems have prompted efforts to develop more effective and less costly apparatus and systems for effecting a rapid and uniformly complete cure in continuously produced heat curable products. For example, U.S. Pat. Nos. 3,513,228 and 3,635,621 each proposes the application of radiant heat to heat curable material or products thereof within a pressurized atmosphere of inert gas, and U.S. Pat. No. 3,645,556 discloses the application of heat through the use of a stagnant body of nitrogen gas under super-atmospheric pressure as a heat transfer medium. Nevertheless, as is apparent, these systems are also complex and require elaborate apparatus.

Another approach to this problem of achieving a rapid cure in products continuously produced with extruding devices, has been to apply heating means in or adjacent to the forming die or outlet passage of extruder apparatus, such as shown in U.S. Pat. Nos. 2,547,151 and 2,972,780.

Moreover, the use of steam under high pressures may produce adverse effects upon some polymeric compositions, or may impede their use in some classes of products or service. For example, high pressure steam drives moisture into polymeric materials or compositions and such a moisture containing condition is especially detrimental in electrical insulations and, accordingly, the moisture must be removed prior to use in electrical applications as noted in U.S. Pat. No. 3,054,142. Thus electrical products such as wires and cables which are insulated with high pressure steam cured polymeric materials require a purging operation such as a heat treatment to drive out entrained moisture from the steam. This adds considerably to the complexity and costs of manufacture.

Additionally polymeric materials are relatively poor conductors of heat, and prior art systems or techniques entail applying an external heat source or heat transfer medium to the exterior of the body of the polymeric material whereby the residence time of exposure to the heating medium or source must be prolonged to achieve curing condition temperatures and their penetration throughout the mass of the body of polymeric material for a uniform cure therethrough. Moreover, due to the relatively poor thermal conductivities of polymeric materials, the application or relatively high temperatures in order to accelerate the curing rate can result in thermal deterioration or damage of the outer portions of the materials before the inner portions are raised to curing conditions.

SUMMARY OF THE INVENTION

This invention comprises a novel process, and apparatus, for the continuous and rapid blending, forming or molding, and curing of heat curable or thermosetting polymeric materials which are effective at high rates of production and do not require additional or extraneous curing apparatus, or complex and elaborate or extensive curing systems.

The process of this invention comprises imposing upon heat curable or thermosetting polymeric materials, or compounds thereof, a coordinated combination of physical conditions, including vigourously mechanically working the heat curable material under pressure to generate internally high temperatures. The mechanical working under pressure is carried to the extent of heating the mass of the heat curable polymeric material, coincidental with blending, to approximately its curing temperature and consecutively therewith forming and molding the incipiently curing material to shape. Heating of the polymeric materials or compositions thereof by means of vigorously mechanically working their mass under high pressures, rapidly and uniformly raises their temperature internally throughout, and the internal temperatures of their mass can thereby be quickly increased up to approximately curing conditions, or preferably up to within a few degrees thereof while being mixed or blended within an extruder. Thus upon forming or molding the mechanically worked and mixed polymeric material to a product shape by advancing it through an extruder die, the heat curable material is already in an inchoative state of curing, or if needed the cure can be rapidly and easily completed thereafter or accelerated by simply boosting the temperature of the incipiently curing material the few additional degrees needed to achieve complete curing therethrough. The boosting of the temperature of the internally and thus uniformly heated, incipiently curing polymeric material the few additional degrees needed to achieve a rapid and complete cure, can be attained with external heating means or devices of relatively low residence times or capacities. Accordingly, the total cure of materials or products thereof rapidly and continuously passing out from the extruder can be accomplished within a short interval or residence time thereafter.

Thus, in accordance with this invention, ancillary heating means or chambers can be eliminated altogether, or at least greatly reduced in size or length, capacity and complexity, thereby overcoming the principal hinderance to faster production output.

OBJECTS OF THE INVENTION

It is a primary object of this invention to provide a continuous process of producing molded-to-shape and cured or thermoset products from heat curable polymeric materials at high rates or production output.

It is also an object of this invention to provide a continuous process of shaping and heat curing which enables the more rapid production of continuously formed heat cured or thermoset, molded products from heat curable polymeric materials and does not require costly or complex additional apparatus.

It is another object of this invention to provide a continuous process of producing cured or thermoset molded products which can be carried out at continuous high production rates with extrusion apparatus.

It is a further object of this invention to provide a continuous process for the manufacture of molded and cured or thermoset products from polymeric materials and compounds thereof at lower costs and higher production rates without detracting from or degrading the quality or other attributes of the products formed, and thereby achieving a savings in equipment and factory floor space while obtaining optimum dispersion and blending of the ingredients to a homogeneous and dense consistency free of gases or voids and producing shaped and uniformly cured articles with smooth, flaw-free surfaces.

It is still a further object of this invention to provide an improved continuous process of rapidly preparing and applying or forming coatings or coverings on elongated articles such as wire or cable with heat curable polymeric materials, and rapidly curing the polymeric materials to a thermoset condition in concert with the continuous forming operations.

It is also a further object of this invention to provide an improved apparatus for the rapid and continuous coincidental blending and heating of heat curable polymeric materials up to substantially their curing temperatures and consecutively therewith molding to shape and curing said polymeric materials.

It is an additional object of this invention to provide a method and apparatus therefor which enables the simplification and reduction in size of ancillary curing apparatus, and minimizes or eliminates the need for subsequent treatments such as moisture purging.

BRIEF DESCRIPTION OF THE DRAWING

The drawing comprises a schematic illustration of the novel apparatus of this invention, and the sequence of operations of the process.

DETAILED DESCRIPTION OF A PREFERRED EMBODIMENT

Figure 1:
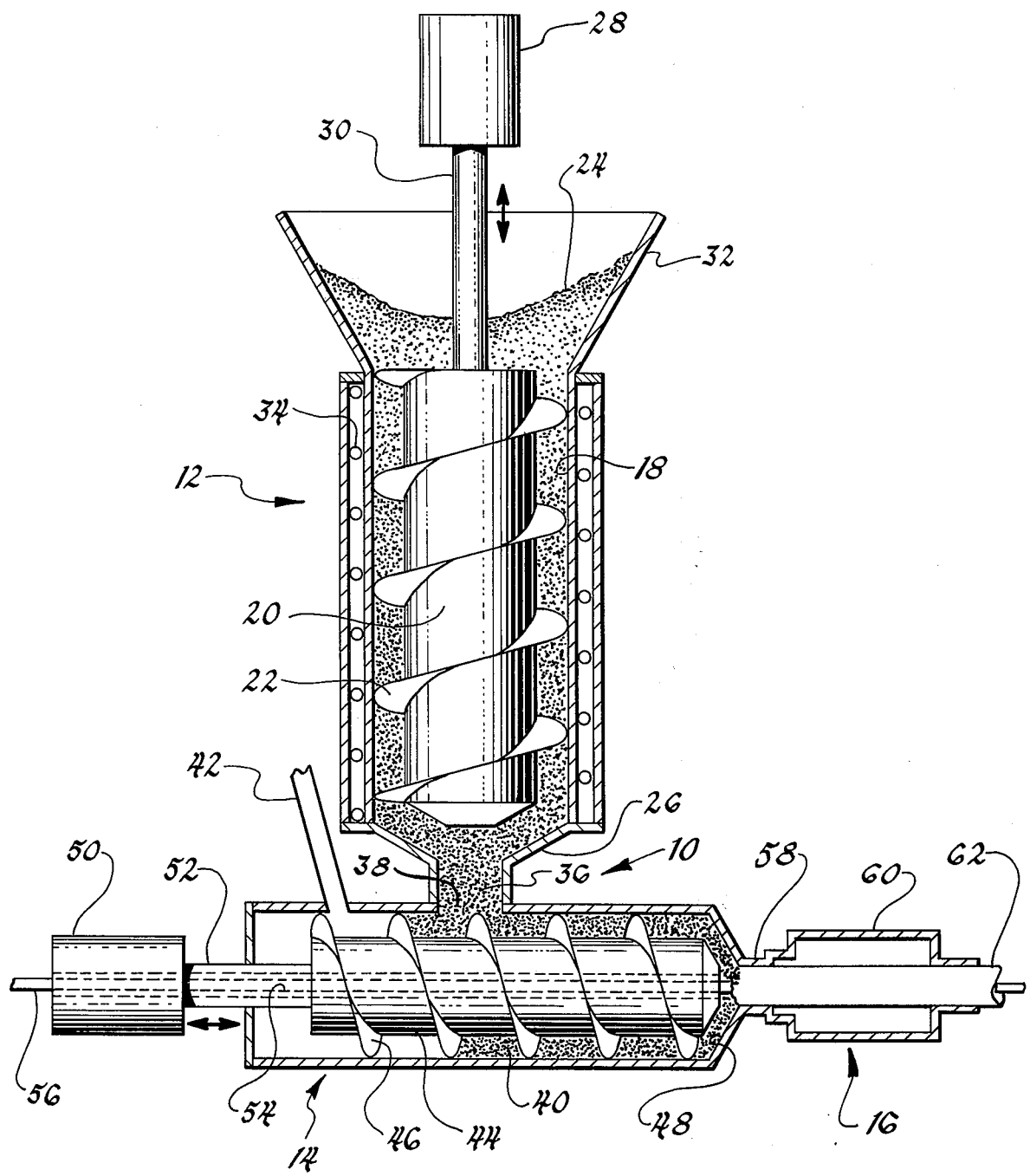

The novel process of this invention comprises a continuous operation of rapidly blending and fluxing or plasticizing, a heat curable or thermosetting polymeric material or compound thereof, while coincidently therewith heating said material or compound internally to substantially its curing condition, and consecutively therewith, continuously forming or molding the hot incipiently curing material or compound to shape, and curing the shaped material or compound to a permanent thermoset condition.

The heat to incite and support the curing of the polymeric material or compound thereof, can be entirely or substantially generated internally within the mass of the polymeric material or compound by means of frictional forces resulting from the shearing action of vigorous mechanical working at high pressures, and therefore is of uniform conditions throughout its mass. The mechanical working and the generation of heat is also a phase of the mixing and blending of the polymer or ingredients of its compound and its fluxing or plasticizing whereby the compounding and heating are simultaneously achieved.

The overall process of continuously preparing or blending, heating, molding to shape and curing of heat curable polymeric materials, includes the continuous feeding or advancing of a mass of heat curable material through a continuous mixing and forming device, such as an extruder, and therein progressively mixing and fluxing the heat curable material to a homogeneous melt while coincidently therewith heating it up to substantially its curing temperature by vigorous mechanical working. Consecutively therewith, the homogeneous melt heated to substantially its curing temperature, is continuously and directly fed or advanced progressively through a forming die and thereby molded to shape and cured to a thermoset condition.

The rate and level of heating the curable polymeric material, or compound thereof, coincidental with its mixing, in the practice of this invention is dependent upon several significant factors, including the speed and pressure conditions of the mixing, or in other words, the degree of mechanical working, and the melt viscosity of the particular heat curable polymeric material or ingredients of the compound thereof. Thus, aside from the properties of the polymeric material or its compound, the rapidity of the process and in particular the generation of internal heat, can be governed or regulated by the degree or intensity of mechanical working and pressure. Moreover, the melt viscosities of many common heat softenable polymeric materials such as polyolefins and elastomers are such that their temperatures can be rapidly and uniformly raised therethroughout by means of vigorous mechanical working under pressure up to levels of about 350°F to about 400°F, or more. Accordingly the curing temperature conditions of many thermosetting materials, or heat-activated curing agents such as peroxides, can be quickly and effectively reached through mechanical action alone.

Pursuant to this invention, the mechanical working or mixing for the purpose of blending and fluxing of the heat curable polymeric material, or compounds thereof, is intensified and governed to the extent of producing the desired or necessary temperature level with respect to particular curing conditions and also which are compatible with the other operations of the continuous process. For example, the attainment of curing conditions in the continuous advancing polymeric material, must be precisely coordinated with its progressive forming or molding to shape and subsequent movement and discharge from the confines of the forming die or mold.

Specifically the degree of mechanically working is gauged to raise the temperature of the continuously advancing heat curable material so as to provide a condition of incipient curing therein approximately at the stage of its progressive molding to shape by passing through a forming die, or soon thereafter. The actual curing of the continuously advancing material, therefore, is timed and initiated at approximately the forming stage or very shortly thereafter, and completed upon emerging from the confines of the forming means or its exit, or soon thereafter. However if the temperature level imparted by the mechanical working is not sufficiently high to fully reach curing conditions, or support the curing action, an additional boost in temperature the level is introduced at the location of the forming die or exit means, or thereafter, by conventional means such as heating devices associated with the die or exit, or by a subsequently arranged separate unit. Thus, curing of the material is subsequently achieved or completed as the shaped and molded material passes from the die member or thereafter by means of external heat applied in the region of the die. Accordingly the cure can be effected during or following the shaping and molding in the die.

Ideally in the practice of this invention, the temperature of the heat curable polymeric material is internally uniformly raised by the mechanical working so as to attain curing conditions substantially coincidentally with its subsequent forming or molding to shape, or promptly thereafter. However, as a practical matter ideal conditions are difficult, if not impossible to achieve or maintain consistently under factory production conditions with a continuous process of this nature and wherein a substantial number of variable conditions are encountered, such as differences in the melt viscosity of polymeric compounds and variations in the responsiveness and half-life of curing agents. Moreover, any failure to achieve or maintain a precisely timed sequence of the physical and chemical conditions or changes therein for the continuously advancing polymeric material in response to or coordinated with the imposed manipulations, and in particular the molding, can result in the occurrence of premature curing of the polymeric material. Premature curing at best inhibits the molding because of reduced plasticity and causes rough and irregular surfaces, and at worst blocks the forming die or other areas of the apparatus and thus terminates the process.

It is therefore expedient and definitely preferred in the routine commercial practice of this invention to gauge the mechanical working and internal heating of the heat curable polymeric material so as to raise its temperature to a level or range of a few degrees below and within easy and quick reach of curing conditions, and thereafter provide a supplemental external heating of only the few additional degrees needed to attain curing conditions and safely to incite or complete the cure following the shaping operation. For instance, the heat curable polymeric material can be internally and uniformly heated by vigorous mechanical working under pressure to a temperature of within about 50°F, or preferably within about 25°F of the materials theoretica or emperical curing temperature, and following the molding step the temperature thereafter need only be increased a few degrees, e.g. about 25°F or 50°F, to safely and expeditiously complete the curing to an advanced thermoset condition. This subsequent heat curing operation or step can, of course, be promptly and easily achieved with a brief residence time since the supplement heat needed is minimal whereby the disadvantages of the prior systems such as extensive apparatus and space requirements therefor, are avoided. Accordingly the process of this invention either eliminates a subsequent curing operation or markedly reduces the residence time thereof and in turn the magnitude of the apparatus.

The process of this invention, especially the preferred and expedient technique previously described, is particularly effective and advantageous for the continuous blending, molding and curing of polymeric materials such as polyolefins or ethylene-containing polymers with organic peroxide curing agents. Typical commercial peroxide curing agents have a relatively short half-life, and since a peroxide free radical induced curing reaction with polyolefins and the like polymers is an exothermic reaction, once curing conditions are reached the reaction becomes self-sustaining or autogenic and thereafter is difficult to control or retard.

Because of the condition of incipient curing of the heat curable material following its vigorous mechanical working and the heating resulting therefrom, a significant aspect of the process and apparatus of this invention is that the mechanically worked and heated polymeric material is rapidly and continuously advanced directly to and through the die forming means, and therefrom directly and quickly exited from any close confinement until after the cure is completed. Specifically, the walls or confining means defining the flow path or route for the advancing material following its heating to substantially curing condition, should be of low or minimum volume and comprise a direct and relatively symmetrical channel free of any abrupt contours, complex configurations or tortuous circuits providing possible areas or pockets or sluggish flow or stagnation whereby the incipiently curing material moves directly and uniformly through the system.

Although the process and apparatus comprising this invention has broader application as to the types or kinds or products which can be produced therewith, the invention is hereinafter described in detail with respect to the manufacture of electrical conductors covered with cured polymeric insulation, such as insulated wire and cable or similar coated articles. The production of insulated conductors comprises an extensive and significant manufacturing business in which this invention is particularly applicable and especially effective and advantageous.

This invention also comprises a novel apparatus for its practice at optimum effectiveness under varying conditions. However the process of the invention can be carried out with other types of extrusion apparatus having the capability of reaching fast screw speeds at high levels of resistance or pressures so as to provide the degree of vigorous mechanical working at high pressures producing the internal shear or friction forces sufficient to generate the quantity of thermal energy needed to reach the curing conditions for a given curable polymer and curing agent or system.

Referring to the drawing, the apparatus of this invention comprises a novel combination which provides optimum flexibility and latitude in the performance of continuous blending, molding and curing of polymeric materials, or compounds thereof, whereby it has the capability of broad application in the field of continuous forming and curing, and provides many advantages in various applications.

The extruding apparatus 10 comprises the combination of a preceding or preliminary section 12, and a subsequent or succeeding section 14 associated with an adjoining heat curing section 16.

The preceding section 12, includes an extruder barrel or cylinder 18, containing a rotatable screw 20 therein provided with the usual helical flights 22 for the progressive advancement and mixing of stock along the barrel from its inlet 24 at one end through to its outlet 26 which is restricted as illustrated. Rotatable screw 20 is provided with a suitable drive means 28, such as an hydraulic motor, and drive shaft 30. Also, rotatable screw 20 is preferably provided with means for its longitudinal reciprocation, as indicated by the double headed arrow in the drawing, within the barrel 18 being movable toward and away from the restricted outlet 26 so as to perform a valving function in cooperation with the restricted outlet 26.

Barrel 18 is preferably provided with a feed hopper 32 at its inlet end for facilitating the introduction and feeding of a constant supply of stock materials. Additionally the barrel 18 is preferably provided with means for preliminary heating of the stock from an external source such as heating jacket 34 comprising either a chamber for a hot fluid such as steam, or electric heating coils.

A port or conduit provides a passage 36 leading from the outlet 26 of the barrel of the preceding extruder section 12 to an inlet 38 in an intermediate portion of the barrel 40 of the subsequent extruder section 14, for the transfer of the progressively advancing stock from said preceding extruder barrel 18 to the subsequent extruder barrel 40.

The barrel 40 of the subsequent extruder is preferably provided with a vent 42, located up stream from its inlet 38 for the degassing of the stock by means of applying reduced pressures through the vent.

Barrel 40 of the subsequent extruder is provided with a rotatable screw 44 having helical flights 46, for the vigorous mechanical working of the stock at a high rate of revolutions while progressively advancing it along the barrel from its inlet 38 through to its outlet 48, which is restricted as illustrated. Rotatable screw 44 is provided with a suitable high speed driving means 50 such as an hydraulic motor and drive shaft 52. The rotatable screw 44 is also provided with means for its longitudinal reciprocation, as indicated by the double headed arrow in the drawing, within the barrel 40 toward and away from the restricted outlet 48 so as to perform a valving function in cooperation with the restricted outlet 48. The valving through movement of the screw enables a wide range of control over the pressure conditions of the mechanical working and in turn the generation of temperatures and rates therefor.

Rotatable screw 44 additionally includes a central passage or axial bore 54 extending the length thereof and also through the length of the drive shaft and drive means to provide for the feeding of a wire or electrical conductor 56 of indefinite length through the length of the screw and centrally through the restricted outlet 48 and forming die 58 adjoining the restricted outlet, in the direction of the arrow shown in the drawing.

The opening of restricted outlet 48 or of the adjoining forming die 58 can be of any suitable cross sectional configuration such as oval, rectangular or triangular, and size or dimensions, but as is customary for typical wire and cable products it is preferably substantially rounded.

Heat curing means 16 comprising an enclosure 60 including a heat source (not shown) such as a heated fluid or electrical means, is provided associated in cooperating close relationship to the forming die 58 and preferably includes a passage therethrough of larger cross-section than the stock or product 62 thereof so as to enable unrestrained movement of the stock or formed product thereof.

A particularly significant aspect of the apparatus of this invention is that the restricted outlet 48 of the subsequent extruder section together with the adjoining forming die 58 comprise a direct and substantially symmetrical or streamlined, low volume channel, of short length, such as a funnel or frusto conical section, in approximately axial alignment with the barrel 40 and its screw 44 and therefore the path of the conductor fed through the screw. This low volume, streamlined contour and arrangement of the channel provides for the symmetrically uniform and rapid movement of the hot, inchoately curing stock through and out of the forming die while concentrically molding to shape around the centrally positioned electrical conductor. Also, it minimizes the possibility of premature curing and solidification of the material disrupting the even flow of the material or the uniformity or surface smoothness of the product formed thereof, Moreover the barrel of subsequent extruder section 14 should have a low length over diameter ratio to provide for the rapid movement of the stock therethrough.

The extruder apparatus 10 of this invention comprises a novel combination of means which provides the versatility to achieve the degree of vigorous mechanical working under pressure to develop relatively high temperature levels for a variety of different polymeric materials and their curing conditions. For example, temperature in the range of about 300°F to about 400°F or higher, uniformly throughout the mass of advancing stock, can be quickly attained with vigorous mechanical working at high pressures provided by the apparatus. The use of two independently driven or controlled extruder sections and screws, moreover, provides greater flexibility in carrying out and controlling the steps of blending and fluxing, homogenizing and heating to substantially curing conditions. For instance, the preceding section 12 can be operated at relatively low speeds of under 100 RPM and moderate pressures, such as about 20 to 40 RPM and about 1000 to 3000 psig, whereby the ingredients can be extensively mixed and fluxed without over heating or danger of too closely approaching curing conditions, such as mixing at temperatures of less than about 250°F. The subsequent section 14 can then be operated independently at relatively high speeds of greater than about 250 RPM and high pressures, such as about 300 to 400 RPM and about 2500 to 4000 psig, which produces a very vigorous mechanical working and rapid rise in temperature through the stock whereupon it can easily and quickly reach curing conditions of many compositions or curing agents within the range of about 300°F to about 450°F.

The following comprise examples of the continuous forming and curing process of this invention as carried out in the foregoing described preferred apparatus, and demonstrates the process conditions for progressive and rapid mixing, shaping and curing. The continuous procedure of the examples comprises the coating of wire with a conventional heat curable, polymeric electrical insulating composition, and its cure, of the following ingredients in relative parts by weight:

| Ingredients | Parts By Weight |
|---|---|
| Polyethylene | 100 |
| Clay, calcined | 50 |
| Carbon black pigment | 5 |
| Antioxidant | 1.75 |
| Vinyl silane | 0.5 |
| Curing agent, di-cumyl peroxide | 3.55 |

The speeds in revolutions per minute of the rotating screw of each section, the pressures developed due to screw speeds combined with valving, and the temperatures thereby developed, as well as output of material in feet per minute, are all given for each example in Table I. However it should be noted and appreciated that due to limitations in the means for measuring the temperature at the extrudate, the recorded temperatures given in the table are generally about 20°F to about 30°F lower than the actual temperature developed throughout the mass of the polymeric material. This is primarily due to the fact that the pyrometer temperature measuring devices usually employed are located at the inner surfaces of the extruder barrels whereat they do not encounter the internal condition of the mixing polymeric material and are also influenced by the disrupting temperature modifying conditions of the metal extruder barrel.

The measured conditions for each example were as follows:

TABLE I

| EXAMPLE | PRECEDING EXTRUDER SECTION ||| SUBSEQUENT EXTRUDER SECTION ||| OUTPUT |
| | SCREW SPEED RPM | PRESSURE PSIG | TEMPERATURE DEGREES F | SCREW SPEED FPM | PRESSURE PSIG | TEMPERATURE DEGREES F | FEET PER MINUTE |
|---|---|---|---|---|---|---|---|
| 1 | 20 | 1900–2500 | 220 | 300 | 2700–2900 | 320 | 200 |
| 2 | 20 | 2000–2600 | 220 | 350 | 2900–3100 | 330 | 225 |
| 3 | 20 | 1700–2400 | 220 | 400 | 3100–3400 | 350 | 255 |
| 4 | 20 | 1800–2400 | 220 | 400 | 3500–4200 | 385 | — |
| 5 | 20 | 2000–2500 | 225 | 400 | 3400–3800 | 360 | 290 |

The cure for each run except Example 4, was completed by passing the coated wire at the indicated speed through a subsequent curing chamber 10 feet in length wherein it was exposed to a stream of nitrogen gas heated to 600°F.

The data of the Examples demonstrates the process flexibility provided by the use of a two unit extruder device, and also how the final temperatures of the heat curable polymeric material can be raised and manipulated by regulating the screw speed and the pressure through the valving mechanism. Also, the previously mentioned low temperature measurements of about 20°F to 30°F registered with the equipment is aptly demonstrated by Example 4 wherein the polymeric material prematurely cured within the apparatus, blocking its system and thereby terminating its operation. The curing temperatures for the polyethylene composition containing di-cumyl peroxide of the formulation given is about 400°F–405°F, whereas the measured temperature was 385°F.

Moreover, this apparent inability to ascertain precise temperature conditions within the mass of mixing polymeric material, coupled with many other possible process and material variables, effectively demonstrates the practicality, if not the necessity, of carrying out the process at temperature levels closely approaching but sufficiently below actual curing conditions, and subsequently completing the operation by boosting the temperature of the material to additional needed degrees for curing with an external source of heat.

The pronounced effects and significance of valving in the method of this invention, and of the reciprocating means of the apparatus for producing the valving action, with respect to the regulation or acceleration of the rate of heating the polymeric materials with internally generated temperatures through mixing, is demonstrated by the following set of data of Table II. In this body of data, the relative degree of valving, or changes therein, is expressed by the distance in inches of the positioning or spacing of the nose or end of the extruder screw from the location of the extruder barrel outlet.

The same polymeric composition as given above and employed in the former examples was used in the following examples, and the conditions for previous Example 1 through 4 are the same as in Examples 6 through 9.

In the runs of Examples 6 through 13, the position of the screw in the preceding extruder section was maintained constant through all runs, and only the number of revolutions of the screw therein was changed as set forth in the data. The pressure conditions, and changes therein, due to the screw speed in revolutions per minute, are therefore demonstrated in this body of data.

However, the spacing of the end of the screw in the subsequent extruder section was changed from a distance of 0.070 inch from the outlet for each run of Examples 6 through 9, to a distance of 0.041 inch from the outlet for each run of Examples 10 through 13. And as indicated, the series of runs of Examples 6 through 9 were carried out at the same sequence of screw speeds of 300, 350, 400, and 400 RPM as the runs of Examples 10 through 13, and with all other conditions the same except for the stated differences in valving. The increased pressures and temperatures due solely to the changes in valving at corresponding screw speeds are shown in the data of Table II.

In the runs of Examples 9 and 13, overheating caused a premature cure within the system, obstructing its production.

TABLE II

| | PRECEDING EXTRUDER SECTION | | | | SUBSEQUENT EXTRUDER SECTION | | | | | OUTPUT |
|---|---|---|---|---|---|---|---|---|---|---|
| EX-AMPLE | SCREW SPEED RPM | VALV-ING INCHES | PRESSURE PSIG | TEMPER-ATURE DEGREES F | SCREW SPEED RPM | VALV-ING INCHES | DIE LAND INCHES | PRESSURE PSIG | TEMPER-ATURE DEGREES F | FEET PER MINUTE |
| 6 | 20 | 1.75 | 1900–2500 | 220 | 300 | 0.070 | 0.790 | 2700–2900 | 320 | 200 |
| 7 | 20 | 1.75 | 2000–2600 | 220 | 350 | 0.070 | 0.790 | 2400–3100 | 330 | 225 |
| 8 | 20 | 1.75 | 1720–2400 | 220 | 400 | 0.070 | 0.790 | 3100–3400 | 350 | 255 |
| 9 | 20 | 1.75 | 1800–2400 | 220 | 400 | 0.070 | 0.790 | 3500–4200 | 385 | — |
| 10 | 20 | 1.75 | 2600–3000 | 230 | 300 | 0.041 | 0.790 | 3300–3700 | 320 | 210 |
| 11 | 20 | 1.75 | 2600–3400 | 230 | 350 | 0.041 | 0.790 | 3600–4000 | 340 | 240 |
| 12 | 20 | 1.75 | 1800–2300 | 235 | 400 | 0.041 | 0.790 | 4100–4300 | 355 | 255 |
| 13 | 20 | 1.75 | 1800–2300 | 230 | 400 | 0.041 | 0.790 | >5000 | >400 | — |

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. A process of continuously molding to shape and curing an ethylene-containing polymer and a heat-activated organic peroxide curing agent to a thermoset condition, comprising the steps of:
   a. continuously advancing a mass of an ethylene-containing polymer and a heat-activated organic peroxide curing agent through a preceding extruder comprising a barrel containing a rotatable screw and therein progressively mixing and fluxing said continuously advancing mass of ethylene-containing polymer and curing agent by mechanically working with the extruder screw rotating at about 20 to about 40 revolutions per minute, and heating said mass to a temperature of not higher than about 250°F;
   b. continuously advancing the mass of ethylene-containing polymer and curing agent progressively from said preceding extruder to a subsequent extruder comprising a barrel and rotatable screw;
   c. continuously advancing the mass of ethylene-containing polymer and curing agent through the subsequent extruder and therein progressively further mixing and fluxing said continuously advancing mass to a homogeneous melt and heating its mass uniformly therethrough up to at least about 350°F by vigorous mechanical working with the rotatable screw rotating at about 300 to about 400 revolutions per minute; and,
   d. continuously and directly advancing said homogeneous molten mass of ethylene-containing polymer and curing agent heated to at least about 350°F, progressively through a forming die and thereby molding it to shape and completing the cure of the shaped polymeric compound to a thermoset condition.

2. The process of claim 1, wherein the ethylene-containing polymer comprises polyethylene.

3. The process of claim 1, wherein the ethylene-containing polymer contains a filler.

4. The process of claim 1, wherein the cure of the shaped, ethylene-containing polymer is completed to a thermoset condition by applying thereto additional heat from an external source.

5. A process of continuously molding to shape and curing an ethylene-containing polymer compound including a heat-activated organic peroxide curing agent to a thermoset condition, comprising the steps of:
   a. continuously advancing a mass of ethylene-containing polymer compound including a heat-activated organic peroxide curing agent through a preceding extruder comprising a barrel containing a rotatable screw and therein progressively mixing and fluxing said continuously advancing mass of compound by mechanically working under a pressure of about 1000 to about 3000 psig with the extruder screw rotating at less than about 100 revolutions per minute, and heating said compound to a temperature of not higher than about 250°F;
   b. continuously advancing the mass of ethylene-containing polymer compound including curing agent progressively from said preceding extruder to a subsequent extruder comprising a barrel containing a rotatable screw, and applying a reduced pressure to the progressively advancing compound to extract therefrom entrained gases;
   c. continuously advancing the mass of hot ethylene-containing polymer compound including a heat-activated organic peroxide curing agent through the subsequent extruder and therein progressively further mixing and fluxing said continuously advancing mass of compound to a homogeneous melt and heating its mass uniformly therethrough up to at least about 350°F by vigorous mechanical working under a pressure of about 2500 to about 4000 psig with the extruder screw rotating at least about 250 revolutions per minute; and,
   d. continuously and directly advancing said homogeneous molten mass of heat ethylene-containing polymer compounding including curing agent heated uniformly therethrough to at least about 350°F, progressively through a forming die and thereby molding it to shape and completing the cure of the shaped polymeric compound to a thermoset condition.

6. The process of claim 5, wherein the cure of the shaped, ethylene-containing polymer compound is completed to a thermoset condition by applying additional heat thereto from an external source.

7. The process of claim 5, wherein the ethylene-containing polymer comprises polyethylene.

8. The process of claim 5, wherein the ethylene-containing polymeric compound comprises a filler.

9. A process of continuously forming a curable polyolefin compound and a heat-activated organic peroxide curing agent on an elongated conductor and curing the polymeric compound to a thermoset condition, comprising the steps of:
   a. continuously advancing a mass of a curable polyolefin compound and a heat-activated organic peroxide curing agent through a preceding extruder comprising a barrel containing a rotatable screw and therein progressively mixing and fluxing said continuously advancing mass of curable polymeric compound by mechanically working with the rotatable screw rotating at less than about 100 revolutions per minute and heating said compound to a temperature of not higher than about 250°F;
   b. continuously advancing the mass of curable polyolefin compound and curing agent progressively from said preceding extruder to a subsequent extruder comprising a barrel containing a rotatable screw;
   c. continuously advancing the mass of curable polyolefin compound and a heat-activated organic peroxide curing agent through the subsequent extruder and therein progressively further mixing and fluxing said continuously advancing mass of curable polymeric compound to a homogeneous melt and heating its mass uniformly therethrough up to at least 350°F by vigorous mechanical working with the rotatable screw rotating at least about 250 revolutions per minute; and,
   d. continuously and directly advancing said homogeneous molten mass of curable polyolefin compound and curing agent heated up to substantially its curing temperature, progressively through a forming die and molding it around an elongated conductor and completing the cure of the molded polyolefin compound to a thermoset condition.

10. The process of claim 9 wherein the ethylene-containing polymer comprises polyethylene.

11. The process of claim 9, wherein the cure of the polyolefin compound molded around the elongated conductor is completed to a thermoset condition by applying additional heat from an external source curing emergence from the die.

12. A process of continuously molding to shape and curing curable polymeric compounds comprising polyethylene and a heat-activated organic peroxide curing agent to a thermoset condition, comprising the steps of:
   a. continuously advancing a mass of curable polymeric compound comprising polyolefin and a heat-activated organic peroxide curing agent through a preceding extruder comprising a barrel containing a rotatable screw and therein progressively mixing and fluxing said advancing mass of curable polymeric compound by mechanically working under a pressure of about 1000 to about 3000 psig with the rotatable screw rotating at about 20 to about 40 revolutions per minute, and heating said compound to a temperature of not higher than about 250°F;
   b. continuously advancing the mass of curable polymeric compound progressively from said preceding extruder to a subsequent extruder comprising a barrel containing a rotatable screw;
   c. continuously advancing the mass of curable polymeric compound through the subsequent extruder and therein progressively further mixing and fluxing said advancing mass of curable polymeric compound to a homogeneous melt and heating its mass uniformly therethrough up to substantially its curing temperature by vigorous mechanical working under a pressure of about 2500 to about 4000 psig with the rotatable screw rotating about 300 to about 400 revolutions per minute; and,
   d. continuously and directly advancing said homogeneous molten mass of hot curable polymeric compound heated to substantially its curing temperature, progressively through a forming die and thereby molding it to shape and completing the cure of the shaped polymeric compound to a thermoset condition.

13. A process of continuously producing elongated electrical conductors insulated with a cured ethylene-containing polymeric compound including a heat-activated organic peroxide curing agent, comprising the steps of:
   a. continuously advancing a mass of curable ethylene-containing polymeric compound including a heat-activated organic peroxide curing agent through a preceding extruder comprising a barrel containing a rotatable screw and therein progressively mixing and fluxing said continuously advancing mass of curable polymeric compound by mechanically working with the extruder screw rotating at less than about 100 revolutions per minute, and heating said compound to a temperature of not higher than about 250°F;
   b. continuously advancing the mass of curable ethylene-containing polymeric compound including a curing agent progressively from said preceding extruder to a subsequent extruder comprising a barrel containing a rotatable screw;
   c. continuously advancing the mass of curable ethylene-containing polymeric compound including a heat-activated organic peroxide curing agent through the subsequent extruder and therein progressively further mixing and fluxing said continuously advancing mass of curable ethylene-containing polymeric compound to a homogeneous melt and heating its mass uniformly therethrough up to at least about 300°F by vigorous mechanical working with the extruder screw rotating;
   d. continuously advancing an elongated conductor longitudinally through a passage extending the length of the rotating screw of said subsequent extruder in the same direction as the continuously advancing polymeric compound and moving said elongated conductor approximately centrally through a forming die while continuously and directly advancing said homogeneous molten mass of curable ethylene-containing polymeric compound heated uniformly therethrough to at least about 300°F, progressively through said forming die about the advancing elongated conductor and thereby molding it around said conductor, and completing the cure of the ethylene-containing polymeric compound to a thermoset condition following emergence from the die.

14. A process of continuously producing elongated electrical conductors insulated with a thermoset polyethylene compound comprising a heat-activated organic peroxide curing agent, comprising the steps of:
   a. continuously advancing a mass of curable polyethylene compound comprising a heat-activated organic peroxide curing agent through a preceding extruder comprising a barrel containing a rotatable screw and therein progressively mixing and fluxing said continuously advancing mass of curable polymeric compound by mechanically working with the extruder screw rotating at less than about 100 revolutions per minute, and heating said compound to a temperature of not higher than about 250°F;
   b. continuously advancing the mass of curable polyethylene compound comprising a curing agent progressively from said preceding extruder to a subsequent extruder comprising a barrel containing a rotatable screw, and applying a reduced pressure to the progressively advancing curable polymeric compound to extract entrained gases therefrom;
   c. continuously advancing the mass of curable polyethylene compound comprising a heat-activated organic peroxide curing agent through the subsequent extruder and therein progressively further mixing and fluxing said continuously advancing mass of curable polymeric compound to a homogeneous melt and heating its mass uniformly therethrough up to at least about 300°F by vigorous mechanical working with the extruder screw rotating at a higher rate of revolutions per minute than the screw of the preceding extruder; and,
   d. continuously advancing an elongated conductor longitudinally through a passage extending the length of the rotating screw of said subsequent extruder in the same direction as the continuously advancing polyethylene compound and moving said elongated conductor approximately centrally through a forming die while continuously and directly advancing said homogeneous molten mass of curable polyethylene compound heated uniformly therethrough to at least about 300°F, progressively through said forming die about the advancing elongated conductor and thereby molding it around said conductor, and completing the cure of the polyethylene compound to a thermoset condition following emergence from the die.

* * * * *